United States Patent
Zhang (10) Patent No.: US 12,073,026 B2
(45) Date of Patent: Aug. 27, 2024

(54) KEYBOARD PERSPECTIVE METHOD AND APPARATUS FOR VIRTUAL REALITY DEVICE, AND VIRTUAL REALITY DEVICE

(71) Applicant: QINGDAO PICO TECHNOLOGY CO., LTD., Qingdao (CN)

(72) Inventor: Ming Zhang, Beijing (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/037,969

(22) PCT Filed: Nov. 12, 2021

(86) PCT No.: PCT/CN2021/130200
§ 371 (c)(1),
(2) Date: May 19, 2023

(87) PCT Pub. No.: WO2022/105677
PCT Pub. Date: May 27, 2022

(65) Prior Publication Data
US 2024/0004477 A1    Jan. 4, 2024

(30) Foreign Application Priority Data
Nov. 23, 2020   (CN) .......................... 202011319697.0

(51) Int. Cl.
G06F 3/01    (2006.01)
G06V 40/10    (2022.01)
G06V 40/20    (2022.01)

(52) U.S. Cl.
CPC .............. *G06F 3/017* (2013.01); *G06F 3/011* (2013.01); *G06V 40/10* (2022.01); *G06V 40/28* (2022.01)

(58) Field of Classification Search
CPC ......... G06F 3/017; G06F 3/011; G06V 40/10; G06V 40/28
See application file for complete search history.

(56) References Cited

U.S. PATENT DOCUMENTS

| 2002/0130844 A1 | 9/2002 | Natoli |
| 2016/0027215 A1 | 1/2016 | Burns et al. |

(Continued)

FOREIGN PATENT DOCUMENTS

| CN | 105975067 A | 9/2016 |
| CN | 106537261 A | 3/2017 |

(Continued)

OTHER PUBLICATIONS

International Patent Application No. PCT/CN2021/130200; Int'l Search Report; dated Feb. 10, 2022; 2 pages.

*Primary Examiner* — Andrey Belousov
(74) *Attorney, Agent, or Firm* — BakerHostetler (57) ABSTRACT

The present application discloses a keyboard perspective method and apparatus for a virtual reality device, and the virtual reality device. The method comprises: recognizing hand actions of two hands of a user; if the hand actions of the two hands of the user meet a preset activation action, activating a keyboard perspective function of a virtual reality device; recognizing hand positions of the two hands of the user under the keyboard perspective function; and determining a keyboard perspective display area according to the hand positions of the two hands of the user so as to display a physical keyboard in a real scene in the keyboard perspective display area. Compared with traditional keyboard perspective schemes, use experience of the user is greatly improved.

10 Claims, 10 Drawing Sheets

(56) References Cited

U.S. PATENT DOCUMENTS

2020/0125377 A1* 4/2020 van Scheltinga ............................ G06F 16/24575
2020/0326847 A1* 10/2020 Wang .................. G06F 3/04883

FOREIGN PATENT DOCUMENTS

| CN | 107368179 A | 11/2017 |
| --- | --- | --- |
| CN | 108334203 A | 7/2018 |
| CN | 108401452 A | 8/2018 |
| CN | 108646997 A | 10/2018 |
| CN | 109885174 A | 6/2019 |
| CN | 110275619 A | 9/2019 |
| CN | 110832441 A | 2/2020 |
| CN | 111415422 A | 7/2020 |
| CN | 112445341 A | 3/2021 |

* cited by examiner

KEYBOARD PERSPECTIVE METHOD AND APPARATUS FOR VIRTUAL REALITY DEVICE, AND VIRTUAL REALITY DEVICE

CROSS REFERENCE TO RELATED APPLICATIONS

The present application is the U.S. National Stage of International Application No. PCT/CN2021/130200, titled "KEYBOARD PERSPECTIVE METHOD AND APPARATUS FOR VIRTUAL REALITY DEVICE, AND VIRTUAL REALITY DEVICE", filed on Nov. 12, 2021, which claims the priority of the Chinese patent application No. 202011319697.0, filed on Nov. 23, 2020 and entitled "KEYBOARD PERSPECTIVE METHOD AND APPARATUS FOR VIRTUAL REALITY DEVICE, AND VIRTUAL REALITY DEVICE", the entire contents of both of which are incorporated herein by reference.

FIELD

The present application relates to the technical field of virtual reality, and in particular to a keyboard perspective method and apparatus for a virtual reality device, and the virtual reality device.

BACKGROUND

With the increase of application scenarios of virtual reality glasses (referred to as "VR glasses"), "productivity tools" have become a new application. In production scenarios, fast keyboard input is required in most cases, and the closed use environment of VR glasses has become an obstacle to keyboard input.

Figure 1:
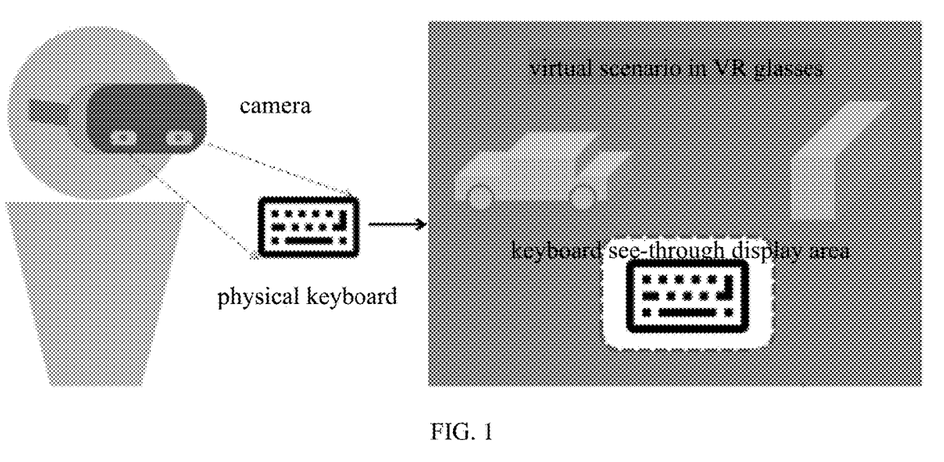
FIG. 1 is a schematic diagram of a keyboard see-through method in the prior art.

To solve the above problems, a solution is proposed in the prior art. As shown in FIG. 1, the position of a keyboard in the field of view is directly recognized by a front-facing camera on the VR glasses, and this position is displayed perspectively in a virtual scenario displayed by the front-facing camera of the VR glasses, such that a function of seeing a physical keyboard of a real world in a virtual scenario displayed by the VR glasses can be achieved.

However, the inventor found that the above technical solution requires additional computing power to recognize the keyboard in the field of view. Due to numerous types of keyboards and low compatibility of the recognition algorithm, the final recognition result is affected.

SUMMARY

In view of this, a main objective of the present application is to provide a keyboard see-through method and apparatus for a virtual reality device, and the virtual reality device, thereby solving the technical problems that an existing keyboard see-through method for a virtual reality device is complicated and has a poor effect.

According to a first aspect of the present application, a keyboard see-through method for a virtual reality device is provided, the method comprises: recognizing hand actions of two hands of a user; activating a keyboard see-through function of the virtual reality device if the hand actions of the two hands of the user meet a preset activation action; determining hand positions of the two hands of the user under the keyboard see-through function; and determining a keyboard see-through display area according to the hand positions of the two hands of the user so as to display a physical keyboard of a real world in the keyboard see-through display area.

According to a second aspect of the present application, a keyboard see-through apparatus for a virtual reality device is provided, the apparatus comprises: a two-hand hand action recognition unit configured to recognize hand actions of two hands of a user; a keyboard see-through function activating unit configured to activate a keyboard see-through function of the virtual reality device if the hand actions of the two hands of the user meet a preset activation action; a two-hand hand position determining unit configured to determine hand positions of the two hands of the user under the keyboard see-through function; and a keyboard see-through display area determining unit configured to determine a keyboard see-through display area according to the hand positions of the two hands of the user so as to display a physical keyboard of a real world in the keyboard see-through display area.

According to a third aspect of the present application, a virtual reality device is provided, the device comprises: a processor and a memory for storing computer-executable instructions, wherein the executable instructions, when executed by the processor, implement the keyboard see-through method for the virtual reality device above-mentioned.

According to a fourth aspect of the present application, a computer-readable storage medium is provided, wherein the computer-readable storage medium stores one or more programs, and the one or more programs, when executed by the processor, cause the processor to implement the keyboard see-through method for the virtual reality device above-mentioned.

The present application has the following beneficial effects: according to a keyboard see-through method for a virtual reality device in embodiments of the present application, hand actions of two hands of a user are recognized first, and then the hand actions of the two hands of the user are matched with a preset activation action, thereby determining whether the user wants to activate a keyboard see-through function of the virtual reality device. If the hand actions of the two hands of the user are matched with the preset activation action, the keyboard see-through function of the virtual reality device can be activated; and then hand positions of the two hands of the user are further determined under the keyboard see-through function, so that a keyboard see-through display area for displaying the keyboard can be determined according to the hand positions of the two hands of the user, and the user can operate a physical keyboard of a real world in the keyboard see-through display area. According to the keyboard see-through method for the virtual reality device in embodiments of the present application, the hand actions and the hand positions of the user are determined by using existing hand action recognition algorithms, and the keyboard see-through display area is determined on this basis; compared with traditional keyboard see-through solutions, the operational capability and the operational complexity are greatly reduced, the compatibility is higher, a more accurate keyboard see-through area can be obtained, and the use experience of the user is greatly improved.

BRIEF DESCRIPTION OF THE DRAWINGS

Various other advantages and benefits will become apparent to those of ordinary skill in the art by reading the detailed description of the preferred embodiment below. The accompanying drawings are used for the purpose of illustrating the preferred embodiment only and are not considered to be limiting to the present application. Moreover, throughout the drawings, the same reference symbols are used to indicate the same components. In the drawings.

DETAILED DESCRIPTION OF THE EMBODIMENTS

Exemplary embodiments of the present application are described in greater detail below with reference to the drawings. These embodiments are provided to enable a more thorough understanding of the present application and to enable the complete scope of the present application to be communicated to those skilled in the art. Although exemplary embodiments of the present application are shown in the drawings, it should be understood that the present application can be implemented in various forms and should not be limited by the embodiments set forth herein.

A virtual reality technology is a computer simulation system that can create and experience a virtual world. The virtual reality technology uses a computer to generate a virtual environment, so that users can immerse themselves in the environment. The virtual reality technology combines real-life data, through electronic signals generated by a computer technology, with various output devices to transform the real-life data into phenomena that people can feel. These phenomena may be real objects in reality, or may be substances that cannot be seen with naked eyes and are expressed through a three-dimensional model. The virtual reality device provided by the present application may be VR glasses. The VR glasses use a head-mounted display device to close people's vision and hearing to the outside world, and guide users to feel in a virtual environment. The display principle of the VR glasses is that left and right eye screens respectively display images of left and right eyes, and a three-dimensional impression is generated in the mind after human eyes obtain the information with a difference. For the convenience of description, VR glasses will be described as an application example of a specific virtual reality device.

Figure 2:
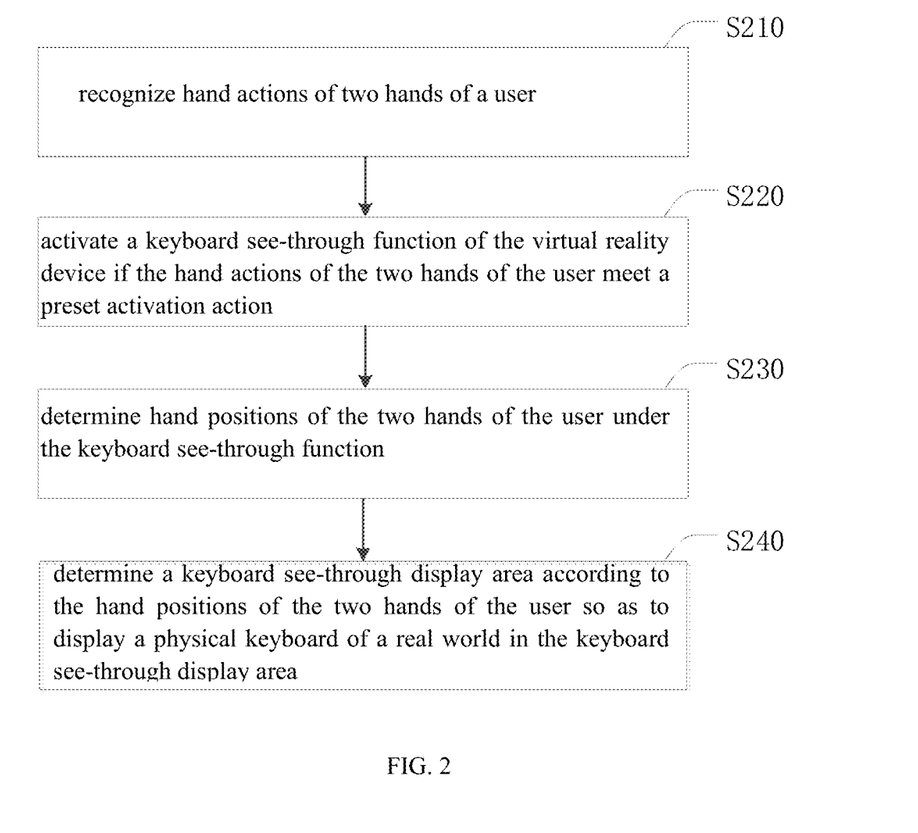
FIG. 2 is a flowchart of a keyboard see-through method for a virtual reality device according to an embodiment of the present application.

FIG. 2 is a flowchart of a keyboard see-through method for a virtual reality device according to an embodiment of the present application. Referring to FIG. 2, the keyboard see-through method for the virtual reality device according to the embodiment of the present application includes the following step S210 to step S240:

step S210: hand actions of two hands of a user are recognized.

The hand actions of the two hands of the user can be recognized firstly when keyboard see-through display of the VR glasses is performed.

Figure 3:
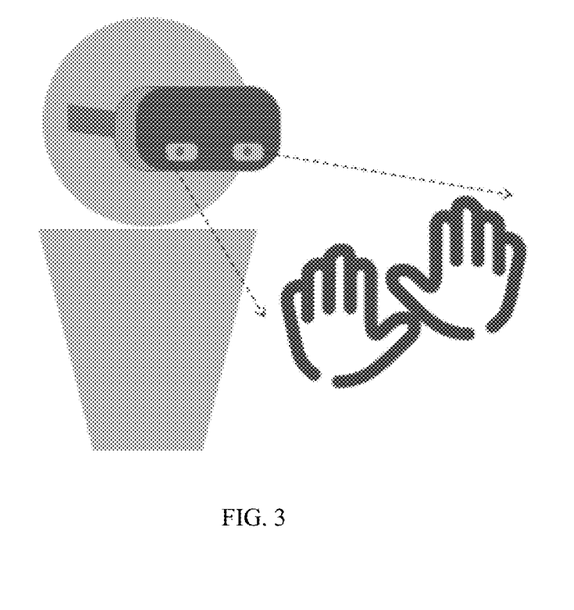
FIG. 3 is a schematic diagram of recognizing hand actions according to an embodiment of the present application.

As shown in FIG. 3, existing VR glasses are generally provided with a binocular camera at a front end outside the glasses for acquiring external environment information and capturing posture movement information of a user, such as hand action information. In an existing virtual reality application scenario, hand actions are recognized usually by a computer vision technology, and the recognition results of the hand actions are often used to perform user interface operations based on the hand actions, or some hand motion sensing games. In embodiments of the present application, the hand actions of two hands of a user can be recognized by information acquired by a camera of the existing VR glasses, thereby combining with the hand actions of the two hands to determine a keyboard see-through display area.

Of course, in addition to the binocular camera, a monocular camera or other types of cameras may also be used to acquire hand action information. The specific type of cameras can be flexibly set by those skilled in the art according to actual needs, which will not be specifically limited here.

When two-hand hand actions are recognized by a computer vision technology, the following method can be adopted specifically: a hand action characteristic and a hand action model are designed first, the characteristic is extracted by a hand action sample, the hand action model is trained, and finally, the hand action model is established. On this basis, a new hand action image is acquired by a binocular camera and is preprocessed, and the hand action image is subjected to hand action segmentation, so that a human hand part can be extracted from the image more accurately; then the hand action characteristic is extracted; and finally, an input hand action is classified and recognized by the hand action model established above.

Of course, in addition to the above recognition method, those skilled in the art can also choose other methods to recognize the hand action according to actual needs, which will not be specifically limited here.

In addition, the hand actions of the two hands of the user can be recognized in real time, thereby responding to the requirements of the user in time. Of course, to save the power of the device, the hand actions of the two hands can be recognized once every other preset time. The specific frequency of recognizing the hand actions of the two hands can be flexibly set by those skilled in the art according to actual needs, which will not be specifically limited here.

Step S220: a keyboard see-through function of the virtual reality device is activated if the hand actions of the two hands of the user meet a preset activation action.

After the hand actions of the two hands of the user are obtained, it is necessary to further determine whether the hand actions of the two hands of the user are actions of activating the keyboard see-through function of the VR glasses. Therefore, the recognized hand actions of the two hands of the user can be matched with the preset activation action. The keyboard see-through function of the VR glasses can be activated at this time if the recognized hand actions of the two hands of the user are matched with the preset activation action successfully. The type of the preset activation action can be flexibly set by those skilled in the art according to actual needs, which will not be specifically limited here.

It should be noted that "activating the keyboard see-through function of the virtual reality device" in this step may be understood that only the keyboard see-through function of the VR glasses is activated, but in essence, the VR glasses have not yet entered a see-through state, that is, the user cannot see the real scenario at present, and it is necessary to perform the subsequent steps to determine the keyboard see-through display area in a viral scenario. Of course, it may be understood that the VR glasses have already entered the see-through state, the user can see the real scenario at present, but to avoid too much influence on the immersive experience of the user, the keyboard see-through display area in the virtual scenario can be re-determined through the subsequent steps.

Step S230: hand positions of the two hands of the user are determined under the keyboard see-through function.

To accurately determine the keyboard see-through display area, the hand positions of the two hands of the user can be further determined by combining with the recognized hand actions of the two hands of the user under the keyboard see-through function, which can serve as the basis for determining the keyboard see-through display area. It should be noted that the hand positions of the two hands of the user may be determined respectively by two palms, or of course, may be determined by the two hands together.

Step S240: a keyboard see-through display area is determined according to the hand positions of the two hands of the user so as to display a physical keyboard of a real world in the keyboard see-through display area.

Figure 4:
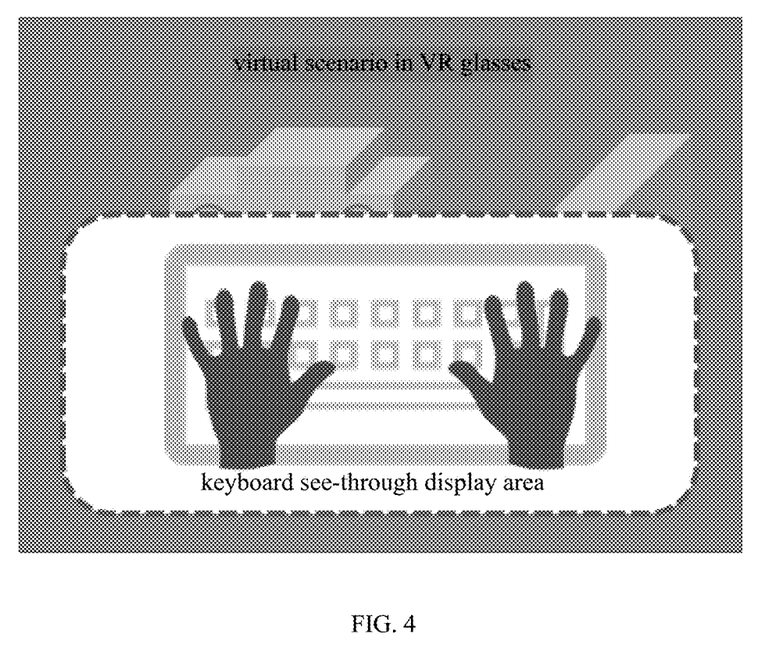
FIG. 4 is a keyboard see-through display effect diagram in VR glasses according to an embodiment of the present application.

The area range of keyboard see-through display can be further determined according to the determined hand positions of the two hands of the user. As shown in FIG. 4, it provides a keyboard see-through display effect diagram in VR glasses according to an embodiment of the present application. The user can operate the physical keyboard in the real scenario in the keyboard see-through display area.

It should be noted that the user usually operates the keyboard with both hands in the practical application scenario, so step S210 in the above embodiment defines that the specific recognition is the hand actions of the two hands of the user. Of course, considering that the main function of step S210 is to determine whether to activate the keyboard see-through function of the VR glasses according to the recognized hand actions of the user, so the preset activation action may be set as a single-hand action, and the hand actions of the two hands and the hand positions of the two hands are recognized subsequently when the keyboard see-through display area is determined.

According to the keyboard see-through method for the virtual reality device provided by the embodiments of the present application, the hand actions and the hand positions of the user are recognized by using existing hand action recognition algorithms, and the keyboard see-through display area is determined on this basis, such that the operational capability and the operational complexity are greatly reduced, the compatibility is higher, and a more accurate keyboard see-through area can be obtained; moreover, compared with traditional keyboard see-through solutions, the use experience of the user is greatly improved.

In one embodiment of the present application, the step of activating the keyboard see-through function of the virtual reality device if the hand actions of the two hands of the user meet the preset activation action includes: it is determined that the hand actions of the two hands of the user meet the preset activation action if the hand actions of the two hands of the user are actions in which the two hands extend downward and approach.

Figure 5:
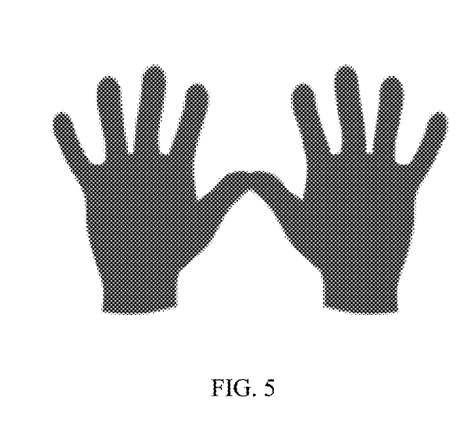
FIG. 5 is a schematic diagram of a preset activation action according to an embodiment of the present application.

The preset activation action in the embodiments of the present application may be an action shown in FIG. 5. If it is recognized that the two hands of the user extend downward and approach, it is considered that the hand actions of the two hands of the user meet the preset activation action, and the keyboard see-through function of the VR glasses is activated. Of course, in addition to the above type of preset activation action, those skilled in the art may set other types of preset activation actions according to actual needs, which will not be listed here.

In one embodiment of the present application, the step of determining the keyboard see-through display area according to the hand positions of the two hands of the user includes: a circumscribed rectangular area of the two hands is determined according to the hand positions of the two hands of the user; and the determined circumscribed rectangular area is enlarged by a preset multiple, and the enlarged circumscribed rectangular area is taken as the keyboard see-through display area.

In the practical application scenario, if the user wants to operate the physical keyboard in the see-through display area, the hand actions of the two hands of the user will be actions in which the two ends extend downward and approach shown in FIG. 5, and it is ensured that the two hands are located on the same horizontal line as possible. Therefore, in the embodiments of the present application, when the keyboard see-through display area is determined according to the hand positions of the two hands of the user, one circumscribed rectangle of the two hands can be determined first; in actual operation, the area where the keyboard is located will exceed the area covered by the circumscribed rectangle of the two hands, so the determined circumscribed rectangle area can be appropriately enlarged by a certain multiple, the size of the multiple can be set flexibly according to actual needs, thereby covering various types of keyboards as possible; and finally, the enlarged circumscribed rectangle area can serve as the keyboard see-through display area, so that the user can operate the physical keyboard in the real scenario in the keyboard see-through display area.

Figure 6:
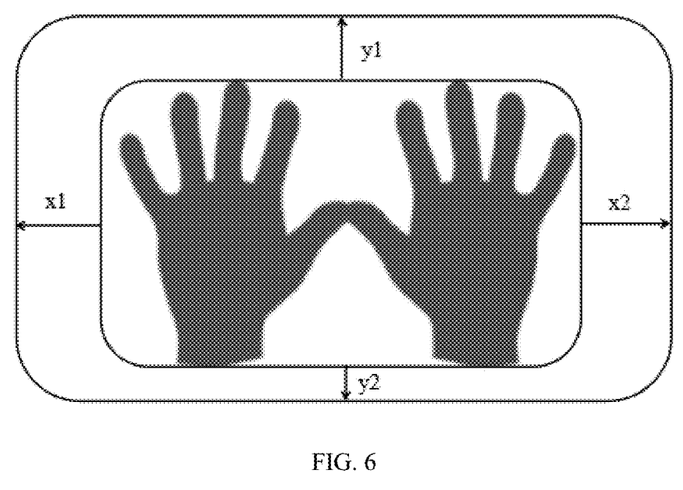
FIG. 6 is a schematic diagram of a keyboard see-through display area according to an embodiment of the present application.

The preset enlarging multiple may be specifically divided into a multiple in a horizontal direction and a multiple in a vertical direction. Further, the multiple in the horizontal direction specifically may include a horizontal-leftward multiple x1 and a horizontal-rightward multiple x2; and the multiple in the vertical direction specifically may include a vertical-upward multiple y1 and a vertical-downward multiple y2. The enlarging multiples in different directions can be configured according to the actual situation. As shown in FIG. 6, it provides a schematic diagram of a keyboard see-through display area according to an embodiment of the present application.

In addition, the enlarging multiple in the horizontal direction may be related to a distance between the two hands. If the distance between the two hands is small or the two hands are in contact with each other, the enlarging multiple in the horizontal direction may be set to a larger value; and if the distance between the two hands is large, the enlarging multiple in the horizontal direction may be set to a smaller value.

In one embodiment of the present application, the step of determining the keyboard see-through display area according to the hand positions of the two hands of the user includes: a circumscribed square area of any palm of the user is determined; a ratio length and a ratio width for expansion are determined according to the size of the circumscribed square area; and a center position of a left palm and a center position of a right palm of the user are determined, the center position of the left palm is connected to the center position of the right palm to form a connecting line, and the ratio length is expanded to a vertical direction and the ratio width is expanded to a horizontal direction according to a midpoint of the connecting line to obtain the keyboard see-through display area.

Figure 7:
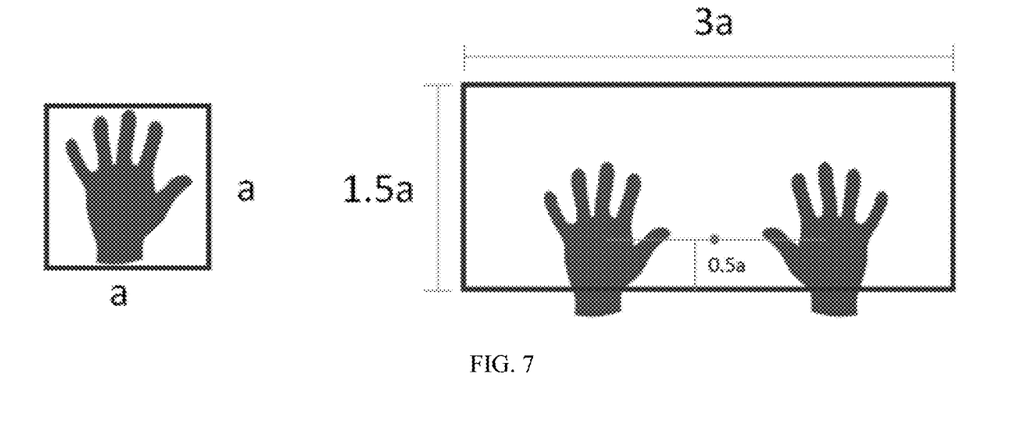
FIG. 7 is a schematic diagram of a keyboard see-through display area according to another embodiment of the present application.

As shown in FIG. 7, in the embodiments of the present application, a circumscribed square of any palm of the user may be determined first when the keyboard see-through display area is determined according to the hand positions of the two hands of the user. Generally, the sizes of the circumscribed squares of two palms are basically the same, so the circumscribed square of which palm will not affect the subsequent determination of the keyboard see-through display area. Then the ratio length and the ratio width for expansion may be determined according to the size of the circumscribed square. When the area is expanded according to the ratio length and the ratio width, the centers of the two palms can be connected to form a connecting line, and then the ratio length is expanded to the vertical direction and the ratio width is expanded to the horizontal direction according to the midpoint of the connecting line to obtain the final keyboard see-through display area. Since the expansion is based on the midpoint of the connecting line, the expansion will not be affected by the distance between the two hands.

For example, assuming that a side length of the circumscribed square is a, according to the midpoint of the connecting line, 1.5a is expanded leftward and rightward respectively, a is expanded upward, and 0.5a is expanded downward. Then the size of the keyboard see-through display area obtained after the expansion is 1.5a×3a.

In one embodiment of the present application, the method further includes: the keyboard see-through function of the virtual reality device is turned off if the hand actions of the two hands of the user meet a preset turn-off action.

In the practical application scenario, the requirement of the user to activate the keyboard see-through display function of the VR glasses may be temporary; therefore, to ensure that the user can rapidly return to the immersive experience of the virtual scenario after using the keyboard see-through display function, it may be detected whether the user has made the hand actions to turn off the keyboard see-through function of the VR glasses. If it is detected that the hand actions of the user are matched with the preset turn-off action, the keyboard see-through display function of the VR glasses can be turned off at this time.

Figure 8:
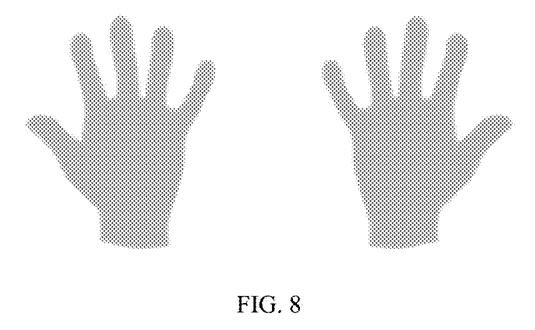
FIG. 8 is a schematic diagram of a preset turn-off action according to an embodiment of the present application.

As shown in FIG. 8, it provides a schematic diagram of a preset turn-off action. The user can turn off the keyboard see-through display function of the VR glasses by making the action of spreading the two hands upward and putting the two hands in front of eyes. Of course, in addition to the preset turn-off action of turning off the keyboard see-through display area in the virtual scenario shown in FIG. 8, other turn-off actions may be set flexibly according to actual needs, which will not be specifically limited here.

In one embodiment of the present application, to avoid the misoperation of the user, when the hand actions of the user meet the preset activation/turn-off action, a more complicated activation/turn-off condition may be further set. For example, the duration of the recognized hand activation/turn-off action of the user may be counted. If the duration exceeds a preset time threshold, it is considered that the user wants to activate/turn off the keyboard see-through display function of the VR glasses. The performing times of the hand activation/turn-off action of the user may be counted. If the performing times reach preset performing times, it is considered that the user wants to activate/turn off the keyboard see-through display function of the VR glasses. How to configure the activation/turn-off condition of the keyboard see-through display function may be set flexibly by those skilled in the art according to actual needs, which will not be listed here.

Figure 9:
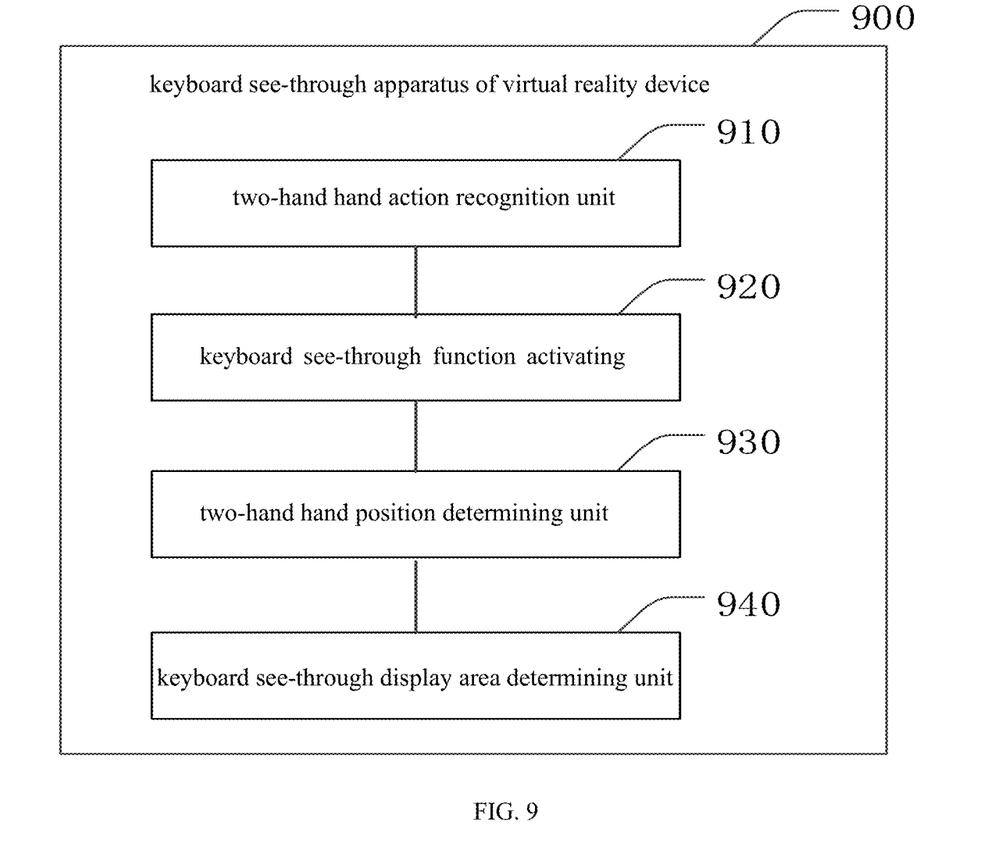
FIG. 9 is a block diagram of a keyboard see-through apparatus for a virtual reality device according to an embodiment of the present application.

Embodiments of the present application further provide a keyboard see-through apparatus for a virtual reality device, which belongs to the same technical concept as that of the keyboard see-through method for the virtual reality device. FIG. 9 is a block diagram of a keyboard see-through apparatus for a virtual reality device according to an embodiment of the present application. Referring to FIG. 9, the keyboard see-through apparatus 900 for the virtual reality device includes: a two-hand hand action recognition unit 910, a keyboard see-through function activating unit 920, a two-hand hand position recognition unit 930 and a keyboard see-through display area determining unit 940.

The two-hand hand action recognition unit 910 is configured to recognize hand actions of two hands of a user.

The keyboard see-through function activating unit 920 is configured to activate a keyboard see-through function of the virtual reality device if the hand actions of the two hands of the user meet a preset activation action.

The two-hand hand position determining unit 930 is configured to determine hand positions of two hands of the user under the keyboard see-through function.

The keyboard see-through display area determining unit 940 is configured to determine a keyboard see-through display area according to the hand positions of the two hands of the user so as to display a physical keyboard of a real world in the keyboard see-through display area.

In one embodiment of the present application, the keyboard see-through function activating unit 920 is specifically configured to: determine that the hand actions of the two hands of the user meet the preset activation action if the hand actions of the two hands of the user are actions in which the two hands extend downward and approach.

In one embodiment of the present application, the keyboard see-through display area determining unit 940 is specifically configured to: determine a circumscribed rectangular area of the two hands according to the hand positions of the two hands of the user; and enlarge the determined circumscribed rectangular area by a preset multiple, and take the enlarged circumscribed rectangular area as the keyboard see-through display area.

In one embodiment of the present application, the keyboard see-through display area determining unit 940 is specifically configured to: determine a circumscribed square area of any palm of the user; determine a ratio length and a ratio width for expansion according to the size of the circumscribed square area; and determine a center position of a left palm and a center position of a right palm of the user, connect the center position of the left palm with the center position of the right palm to form a connecting line, and expand the ratio length in a vertical direction and expand the ratio width in a horizontal direction according to a midpoint of the connecting line to obtain the keyboard see-through display area.

In one embodiment of the present application, the apparatus further includes: a keyboard see-through function turn-off unit, configured to turn off the keyboard see-through function of the virtual reality device if the hand actions of the two hands of the user meet a preset turn-off action.

Figure 10:
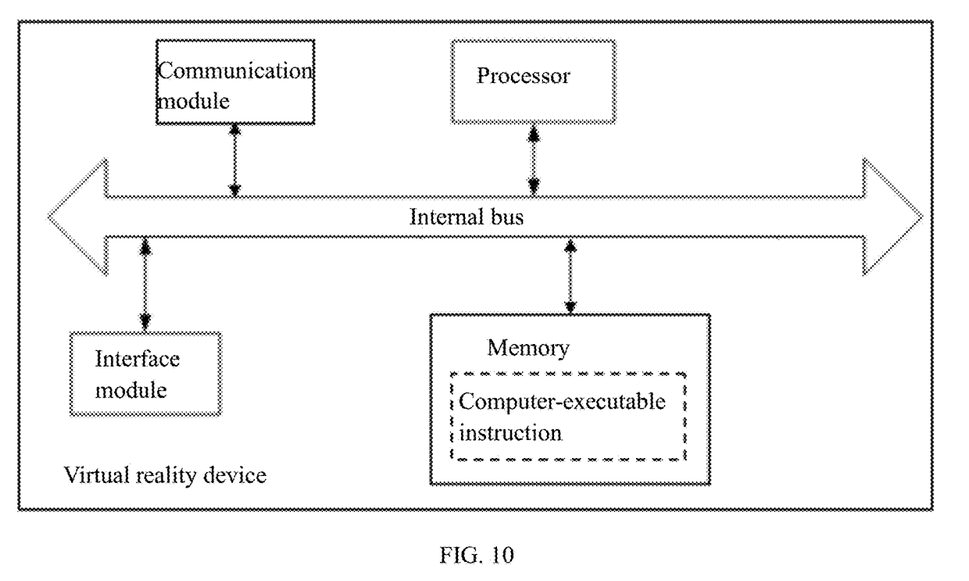
FIG. 10 is a structural schematic diagram of a virtual reality device according to an embodiment of the present application.

It should be noted that:

FIG. 10 is a structural schematic diagram of a virtual reality device. Referring to FIG. 10, in the hardware level, the virtual reality device includes a memory and a processor, and optionally, further includes an interface module, a communication module and the like. The memory may include an internal memory, such as a high-speed random-access memory (RAM), and may further include a non-volatile memory, such as at least one disk memory. Of course, the virtual reality device may further include hardware required by other services.

The processor, the interface module, the communication module and the memory may be connected mutually through an internal bus. The internal bus may be an industry standard architecture (ISA) bus, a peripheral component interconnect (PCI) bus or an extended industry standard architecture (EISA) bus. The bus may be divided into an address bus, a data bus and a control bus. For the convenience of representation, only one double-sided arrow is used in FIG. 10, but it does not mean that there is only one bus or one type of bus.

The memory is configured to store computer-executable instructions. The memory provides the computer-executable instructions to the processor through the internal bus.

The processor executes the computer-executable instructions stored in the memory, and is specifically configured to implement the following operations:

recognizing hand actions of two hands of a user;

activating a keyboard see-through function of the virtual reality device if the hand actions of the two hands of the user meet a preset activation action;

determining hand positions of the two hands of the user under the keyboard see-through function; and determining a keyboard see-through display area according to the hand positions of the two hands of the user so as to display a physical keyboard of a real world in the keyboard see-through display area.

The function performed by the keyboard see-through apparatus of the virtual reality device disclosed by the embodiment of the present application shown in FIG. 9 may be applied to the processor or be implemented by the processor. The processor may be an integrated circuit chip, and has a signal processing capability. During the implementation, each step of the method may be performed through an integrated logic circuit of hardware in a processor or through instructions in the form of software. The processor may be a general-purpose processor, including a central processing unit (CPU), a network processor (NP) and the like; or the processor may be a digital signal processor (DSP), an application specific integrated circuit (ASIC), a field-programmable gate array (FPGA) or another programmable logic device, a discrete gate or a transistor logic device, a discrete hardware component. The processor may implement or perform the methods, the steps, and logical block diagrams that are disclosed in the embodiments of this application. The general-purpose processor may be a microprocessor, or the processor may be any conventional processor. Steps of the methods disclosed with reference to the embodiments of this application may be directly performed and completed through a hardware decoding processor, or may be performed and completed by using a combination of hardware and software modules in the decoding processor. The software module may be located in a mature storage medium in this field, such as a random access memory, a flash memory, a read-only memory, a programmable read-only memory or an electrically erasable programmable memory, or a register. The storage medium is located in the memory. The processor reads information in the memory, and completes steps of the foregoing method in combination with hardware of the processor.

The virtual reality device may perform the steps performed in the keyboard see-through method for the virtual reality device in FIG. 1, and implement the function of the keyboard see-through method for the virtual reality device in the embodiment shown in FIG. 1, which will not be elaborated herein in the embodiments of the present application.

Embodiments of the present application further provide a computer-readable storage medium. The computer-readable storage medium stores one or more programs. When the one or more programs are executed by a processor, the foregoing keyboard see-through method for the virtual reality device is implemented, which is specifically configured to perform the following operations:

recognizing hand actions of two hands of a user;

activating a keyboard see-through function of the virtual reality device if the hand actions of the two hands of the user meet a preset activation action;

determining hand positions of the two hands of the user under the keyboard see-through function; and determining a keyboard see-through display area according to the hand positions of the two hands of the user so as to display a physical keyboard of a real world in the keyboard see-through display area.

Those skilled in the art should understand that embodiments of the present application may be provided as methods, systems, or computer program products. Accordingly, the present application may take the form of an entirely hardware embodiment, an entirely software embodiment, or an embodiment combining software and hardware aspects. Further, the present application may take the form of a computer program product implemented on one or more computer-usable storage media (including, but not limited to, disk memory, CD-ROM, optical memory, etc.) containing computer-usable program code.

The present application is described in terms of flowcharts and/or block diagrams of methods, devices (systems), and computer program products of embodiments of the present application. It should be understood that each process and/or box in the flowchart and/or block diagram, and the combination of processes and/or boxes in the flowchart and/or block diagram, may be implemented by computer program instructions. These computer program instructions may be provided to a processor of a general purpose computer, a specialized computer, an embedded processor, or other programmable data processing device to produce a machine such that the instructions executed by the processor of the computer or other programmable data processing device produce a device for implementing the functions specified in one process or multiple processes in the flowchart and/or one box or multiple boxes in the block diagram.

These computer program instructions may also be stored in a computer readable memory capable of directing a computer or other programmable data processing device to operate in a particular manner such that the instructions stored in such computer readable memory produce an article of manufacture comprising an instruction device that implements the function specified in one or more processes of a flowchart and/or one or more boxes of a block diagram.

These computer program instructions may also be loaded onto a computer or other programmable data processing device such that a series of operational steps are executed on the computer or other programmable device to produce computer-implemented processing such that the instructions executed on the computer or other programmable device provide steps for implementing the functions specified in one or more processes of a flowchart and/or one or more boxes of a block diagram.

In a typical configuration, a computing device includes one or more processors (CPUs), input/output interfaces, network interfaces, and memory.

Memory may include non-permanent memory in the form of computer readable media, random access memory (RAM) and/or non-volatile memory, such as read-only memory (ROM) or flash memory (flash RAM). Memory is an example of a computer readable medium.

Computer readable media including permanent and non-permanent, removable and non-removable media can be used by any method or technology to implement information storage. The information may be computer readable instructions, data structures, modules of a program, or other data. Examples of storage media for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc only Read Memory (CD-ROM), Digital Versatile Disc (DVD) or other optical storage, magnetic cartridge tape, magnetic tape disk storage or other magnetic storage device, or any other non-transport medium that can be used to store information that can be accessed by a computing device. As defined herein, computer readable media does not include transient computer readable media (transitory media), such as modulated data signals and carriers.

It is also important to note that the terms "includes," "comprises," or any other variation thereof are intended to cover non-exclusive inclusion, such that a process, method, commodity, or apparatus comprising a set of elements includes not only those elements, but also other elements not expressly listed, or elements inherent to such process, method, commodity, or apparatus. other elements not explicitly listed, or that are inherent to such process, method, commodity, or device. Without further limitation, the inclusion of an element as defined by the statement "including a . . . " does not preclude the existence of additional identical elements in the process, method, article, or apparatus that includes the element.

It should be understood by those skilled in the art that embodiments of the present application may be provided as methods, systems, or computer program products. Accordingly, the present application may take the form of an entirely hardware embodiment, an entirely software embodiment, or an embodiment combining software and hardware aspects. Further, the present application may take the form of a computer program product implemented on one or more computer-usable storage media (including, but not limited to, disk memory, CD-ROM, optical memory, etc.) characterized by the inclusion of computer-usable program code therein.

The above is only an example of the present application, and is not intended to limit the present application. To a person skilled in the art, this application may have various changes and variations. Any modification, equivalent replacement, improvement, etc. made within the spirit and principle of this application should be included in the scope of the claims of this application.

What is claimed is:

1. A keyboard see-through method for a virtual reality device, comprising:
   recognizing hand actions of two hands of a user;
   activating a keyboard see-through function of the virtual reality device if the hand actions of the two hands of the user meet a preset activation action;
   determining hand positions of the two hands of the user under the keyboard see-through function; and
   determining a keyboard see-through display area according to the hand positions of the two hands of the user so as to display a physical keyboard of a real world in the keyboard see-through display area, wherein the determining a keyboard see-through display area according to the hand positions of the two hands of the user further comprises:
   determining a circumscribed rectangular area of the two hands according to the hand positions of the two hands of the user, and
   enlarging the determined circumscribed rectangular area by a preset multiple and determining the enlarged circumscribed rectangular area as the keyboard see-through display area.

2. The method according to claim 1, wherein activating the keyboard see-through function of the virtual reality device if the hand actions of the two hands of the user meet the preset activation action comprises:
   determining that the hand actions of the two hands of the user meet the preset activation action if the hand actions of the two hands of the user are actions in which the two hands extend downward and approach.

3. The method according to claim 1, wherein determining the keyboard see-through display area according to the hand positions of the two hands of the user comprises:
   determining a circumscribed square area of any palm of the user;
   determining a ratio length and a ratio width for expansion according to the size of the circumscribed square area; and
   determining a center position of a left palm and a center position of a right palm of the user, connecting the center position of the left palm with the center position of the right palm to form a connecting line, and expanding the ratio length to a vertical direction and expanding the ratio width to a horizontal direction according to a midpoint of the connecting line to obtain the keyboard see-through display area.

4. The method according to claim 1, further comprising:
   turning off the keyboard see-through function of the virtual reality device if the hand actions of the two hands of the user meet a preset turn-off action.

5. A virtual reality device, comprising: a processor, and a memory storing computer-executable instructions, wherein the computer-executable instructions, when executed by the processor, cause the processor to implement operations comprising:
   recognizing hand actions of two hands of a user;
   activating a keyboard see-through function of the virtual reality device if the hand actions of the two hands of the user meet a preset activation action;
   determining hand positions of the two hands of the user under the keyboard see-through function; and
   determining a keyboard see-through display area according to the hand positions of the two hands of the user so as to display a physical keyboard of a real world in the keyboard see-through display area, wherein the determining a keyboard see-through display area according to the hand positions of the two hands of the user further comprises:

determining a circumscribed rectangular area of the two hands according to the hand positions of the two hands of the user, and enlarging the determined circumscribed rectangular area by a preset multiple and determining the enlarged circumscribed rectangular area as the keyboard see-through display area.

6. The virtual reality device according to claim 5, wherein activating the keyboard see-through function of the virtual reality device if the hand actions of the two hands of the user meet the preset activation action comprises:

determining that the hand actions of the two hands of the user meet the preset activation action if the hand actions of the two hands of the user are actions in which the two hands extend downward and approach.

7. The virtual reality device according to claim 5, wherein determining the keyboard see-through display area according to the hand positions of the two hands of the user comprises:

determining a circumscribed square area of any palm of the user;

determining a ratio length and a ratio width for expansion according to the size of the circumscribed square area; and determining a center position of a left palm and a center position of a right palm of the user, connecting the center position of the left palm with the center position of the right palm to form a connecting line, and expanding the ratio length to a vertical direction and expanding the ratio width to a horizontal direction according to a midpoint of the connecting line to obtain the keyboard see-through display area.

8. A non-transitory computer-readable storage medium, wherein the storage medium stores a computer program, and the computer program, when executed by a processor, cause the processor to perform operations comprising:

recognizing hand actions of two hands of a user;

activating a keyboard see-through function of the virtual reality device if the hand actions of the two hands of the user meet a preset activation action;

determining hand positions of the two hands of the user under the keyboard see-through function; and determining a keyboard see-through display area according to the hand positions of the two hands of the user so as to display a physical keyboard of a real world in the keyboard see-through display area, wherein the determining a keyboard see-through display area according to the hand positions of the two hands of the user further comprises:

determining a circumscribed rectangular area of the two hands according to the hand positions of the two hands of the user, and enlarging the determined circumscribed rectangular area by a preset multiple and determining the enlarged circumscribed rectangular area as the keyboard see-through display area.

9. The non-transitory computer-readable storage medium according to claim 8, wherein activating the keyboard see-through function of the virtual reality device if the hand actions of the two hands of the user meet the preset activation action comprises:

determining that the hand actions of the two hands of the user meet the preset activation action if the hand actions of the two hands of the user are actions in which the two hands extend downward and approach.

10. The non-transitory computer-readable storage medium according to claim 8, wherein determining the keyboard see-through display area according to the hand positions of the two hands of the user comprises:

determining a circumscribed square area of any palm of the user;

determining a ratio length and a ratio width for expansion according to the size of the circumscribed square area; and determining a center position of a left palm and a center position of a right palm of the user, connecting the center position of the left palm with the center position of the right palm to form a connecting line, and expanding the ratio length to a vertical direction and expanding the ratio width to a horizontal direction according to a midpoint of the connecting line to obtain the keyboard see-through display area.

* * * * *